(12) United States Patent
Jang et al.

(10) Patent No.: US 10,811,918 B2
(45) Date of Patent: Oct. 20, 2020

(54) STACK STRUCTURE OF ROTOR CORE

(71) Applicant: NEW MOTECH CO., LTD., Gwangju (KR)

(72) Inventors: Jeong Cheol Jang, Gwangju (KR); Ji Min Lee, Gwangju (KR); Nam Jong Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 175 days.

(21) Appl. No.: 15/555,512

(22) PCT Filed: Jun. 19, 2015

(86) PCT No.: PCT/KR2015/006231
§ 371 (c)(1),
(2) Date: Sep. 4, 2017

(87) PCT Pub. No.: WO2016/182117
PCT Pub. Date: Nov. 17, 2016

(65) Prior Publication Data
US 2018/0048200 A1    Feb. 15, 2018

(30) Foreign Application Priority Data
May 11, 2015   (KR) .......................... 10-2015-0065109

(51) Int. Cl.
*H02K 1/27*         (2006.01)

(52) U.S. Cl.
CPC ................. *H02K 1/2773* (2013.01)

(58) Field of Classification Search
CPC ........... H02K 1/2773; H02K 1/28; H02K 1/27
(Continued)

(56) References Cited

U.S. PATENT DOCUMENTS 5,939,810 A *  8/1999  Uchida ................ H02K 1/2773
                                                310/156.57
6,847,143 B1 *  1/2005  Akemakou .......... H02K 21/042
                                                310/154.38
(Continued)

FOREIGN PATENT DOCUMENTS

CN         104011975 A    8/2014
DE    102011122023 A1 *  6/2013 ........... H02K 1/2773
(Continued)

OTHER PUBLICATIONS

International Search Report for PCT/KR2015/006231 dated Feb. 29, 2016 from Korean Intellectual Property Office.

*Primary Examiner* — Thienvu V Tran
*Assistant Examiner* — Bart Iliya
(74) *Attorney, Agent, or Firm* — Revolution IP, PLLC

(57) ABSTRACT

A stack structure of a rotor core, includes: a plurality of first core layers, each of the first core layers being formed by stacking first core sheets, each of the first core sheets including: an annular base having a shaft through-hole at a central portion thereof; a plurality of yokes spaced apart from each other to be arranged along a circumferential direction of the base and to form a plurality of magnet insertion parts for accommodating magnets; and a plurality of bridges connecting the base and the yokes; and a plurality of second core layers, each of the second core layers being formed by stacking second core sheets, each of the second core sheets including: a plurality of yokes in which the bases and the bridges are removed from the first core sheet, wherein the first core layers and the second core layers are alternately stacked.

1 Claim, 6 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 8,519,588 B2* | 8/2013 | Amrhein | H02K 1/276 |
| | | | 310/156.56 |
| 2011/0127859 A1 | 6/2011 | Amrhein et al. | |
| 2011/0187222 A1 | 8/2011 | Li et al. | |
| 2014/0191608 A1 | 7/2014 | Jang et al. | |
| 2014/0300243 A1 | 10/2014 | Berkouk et al. | |
| 2015/0035402 A1 | 2/2015 | Reddy et al. | |
| 2015/0372549 A1* | 12/2015 | Pan | H02K 1/2773 |
| | | | 310/156.45 |

FOREIGN PATENT DOCUMENTS

KR   10-2013-0085336 A   7/2013
WO          02-47238 A1   6/2002

\* cited by examiner

[Fig. 1]
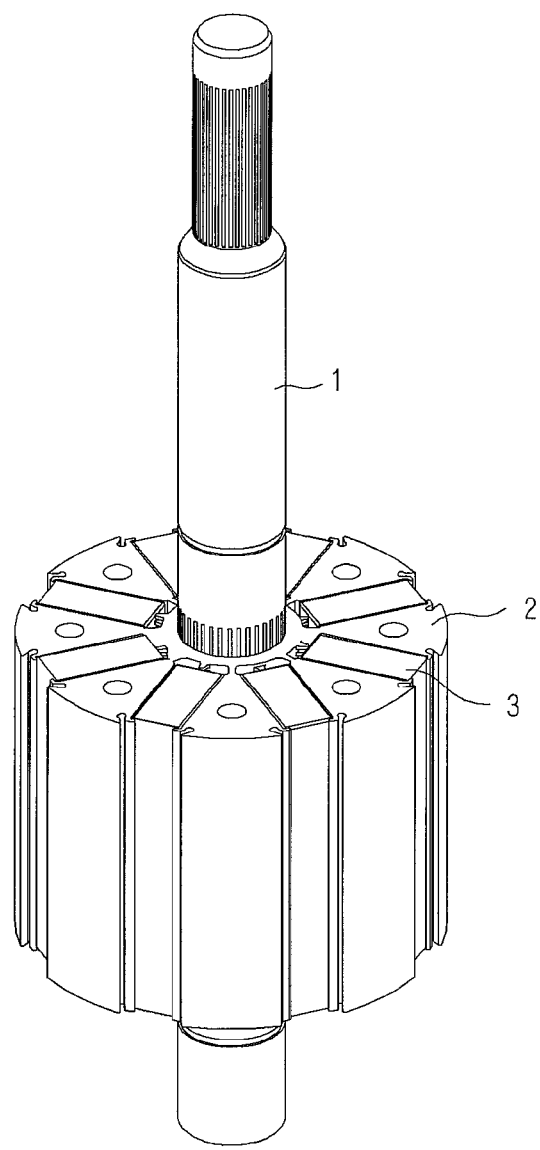

[Fig. 2]
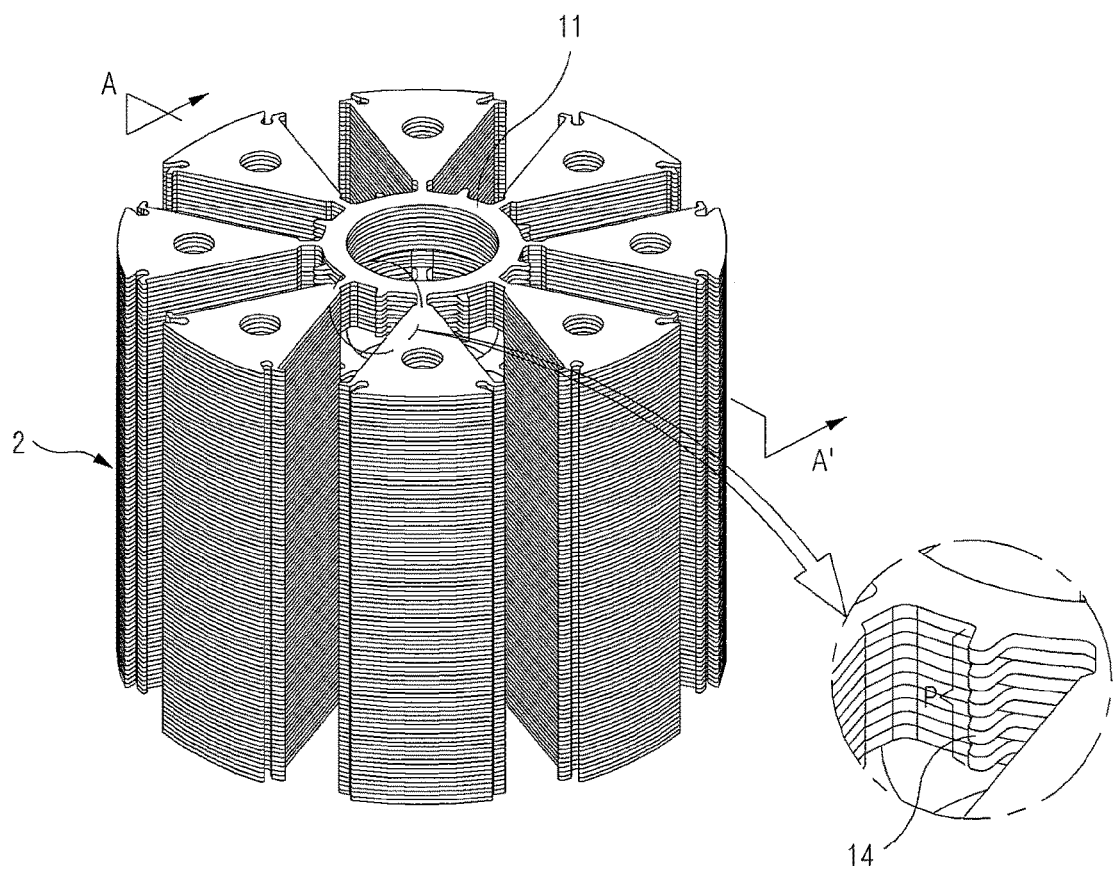

[Fig. 3]
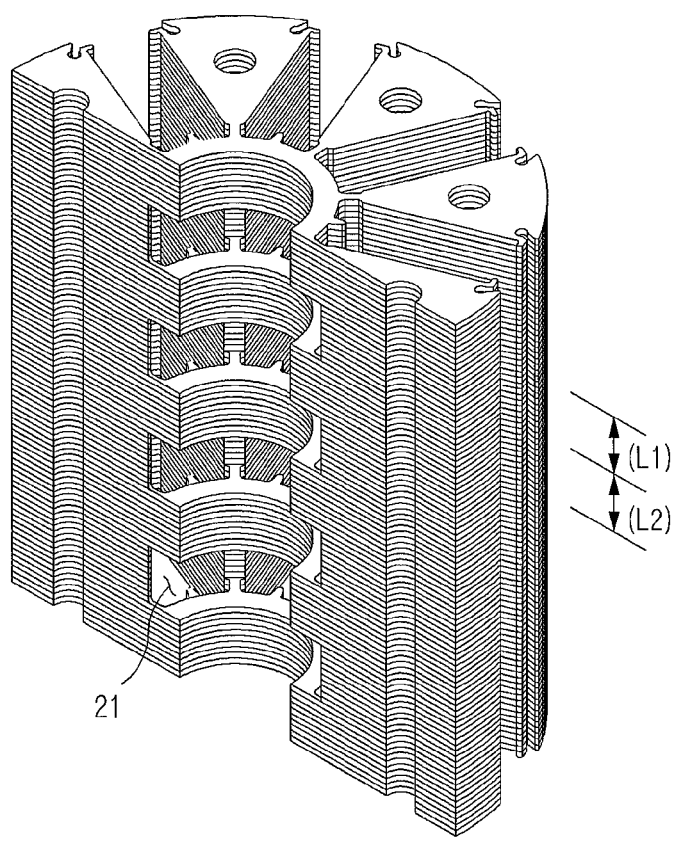

[Fig. 4]
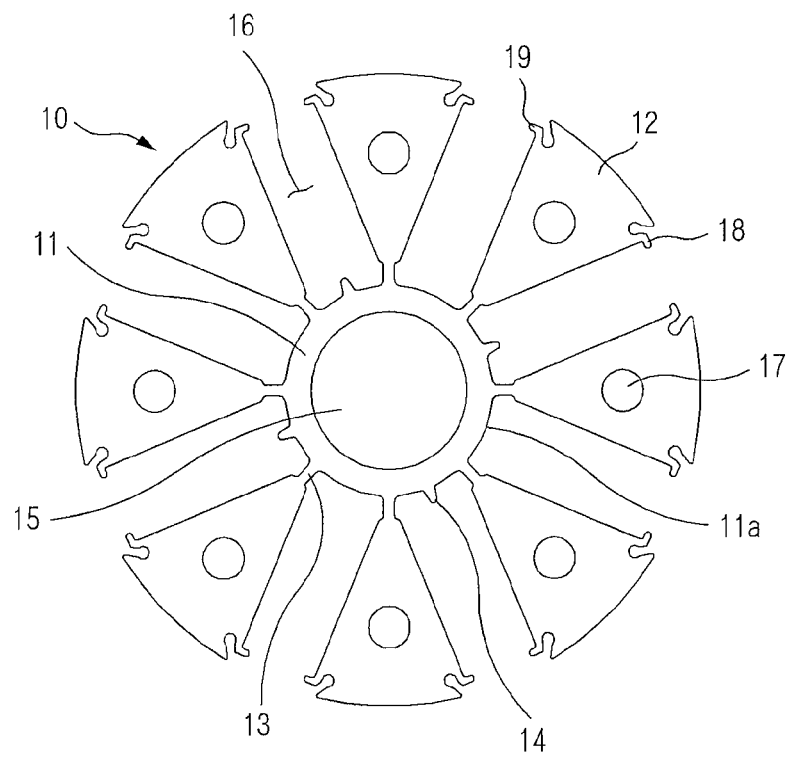

[Fig. 5]
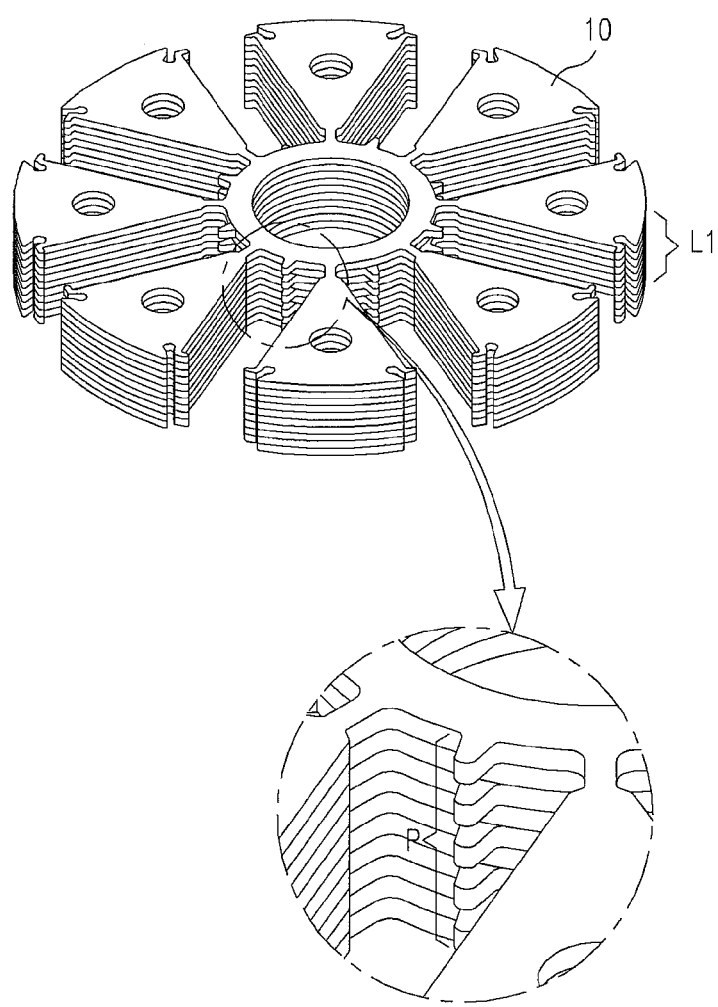

[Fig. 6]
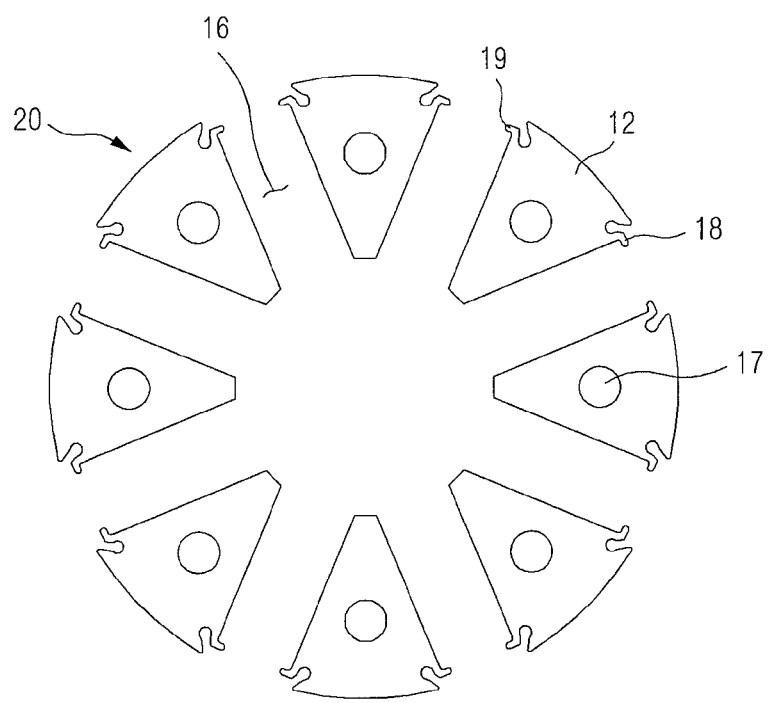
[Fig. 7]
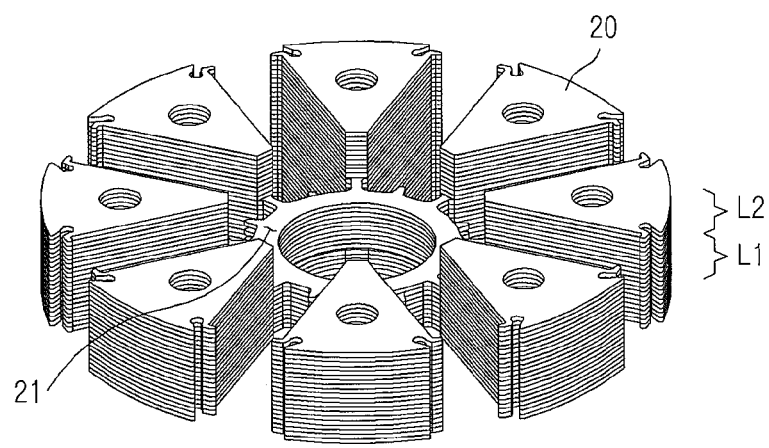

STACK STRUCTURE OF ROTOR CORE

CROSS REFERENCE TO PRIOR APPLICATIONS

This application is a National Stage Application of PCT International Patent Application No. PCT/KR2015/006231 filed on Jun. 19, 2015, under 35 U.S.C. § 371, which claims priority to Korean Patent Application No. 10-2015-0065109 filed on May 11, 2015, which are all hereby incorporated by reference in their entirety.

TECHNICAL FIELD

The present invention relates to a spoke type permanent magnet motor. More particularly, the present invention relates to a stack structure of a rotor core for minimizing leakage magnetic fluxes in a spoke type permanent magnet motor.

BACKGROUND ART

A motor is a machine for obtaining a rotational force from electrical energy, and includes a stator and a rotor. The rotor electromagnetically interacts with the stator, and is rotated by a magnetic field and a force applied between currents flowing through coils.

Permanent magnet motors that use permanent magnets to generate magnetic fields include a surface mounted permanent magnet motor and an interior type permanent magnet motor.

In particular, as one form of an interior type permanent magnet motor, a spoke type permanent magnet motor structurally increases magnetic flux concentration and accordingly, generates high torque and high output, and a motor can be miniaturized for the same output and accordingly, may be applied to a driving motor, for example, of a washing machine or an electric vehicle that requires high torque and high output.

In general, as disclosed in Korean Patent Application Publication No. 10-2013-0085336, the rotor of a spoke type permanent motor includes a magnet disposed radially about a shaft and a rotor core provided to form a passage of magnetic fluxes while supporting magnets. The rotor core may include yokes disposed between magnets, and a cylindrical base located between a shaft and the magnets and connected to the yokes.

Meanwhile, in the spoke type permanent magnet motor according to the related art, some of magnetic fluxes may be leaked towards the shaft through the base of the rotor core, but the output of the motor may decreases if the leakage magnetic flux increases, and accordingly, the motor has disadvantages in material costs and miniaturization of the motor because the in-use amount of the permanent magnet increases as compared with the motor of the same output.

Accordingly, the present inventors suggest a stack structure of a rotor core that can minimize leakage magnetic fluxes.

DISCLOSURE OF INVENTION

Technical Problem

An aspect of the present invention is directed to a stack structure of a rotor core that minimizes leakage magnetic fluxes of a magnet and improves output.

Another aspect of the present invention is directed to a stack structure of a rotor core that minimizes support bosses of a rotor core and improves output.

The objects of the present invention and other objects can be easily achieved by the present invention.

Solution to Problem

In accordance with an aspect of the present invention, there is provided a stack structure of a rotor core, comprising: a plurality of first core layers, each of the first core layers being formed by stacking first core sheets, each of the first core sheets comprising: an annular base having a shaft through-hole at a central portion thereof; a plurality of yokes spaced apart from each other to be arranged along a circumferential direction of the base and to form a plurality of magnet insertion parts for accommodating magnets; and a plurality of bridges connecting the base and the yokes; and a plurality of second core layers, each of the second core layers being formed by stacking second core sheets, each of the second core sheets comprising: a plurality of yokes in which the bases and the bridges are removed from the first core sheet, wherein the first core layers and the second core layers are alternately stacked.

In the present invention, a plurality of boss forming parts formed between two adjacent bridges are provided in the base of the first core sheet, and support bosses protrude from the base into spaces of the magnet insertion parts only in some of the plurality of boss forming parts, and the support bosses discontinuously appear axially on a side surface of the base of the first core layer.

In the present invention, the first core layer is formed by stacking the first core sheets while rotating the first core sheets at a predetermined angle.

In the present invention, the number of the yokes is eight, the support bosses are formed in the first, third, fifth, and seventh boss forming parts in a circumferential direction of the base, and the angle is 45 degrees.

In the present invention, the number of the yokes is eight, the support bosses are formed in the first, second, third, and fourth boss forming parts in a circumferential direction of the base, and the angle is 180 degrees.

In the present invention, the first core layer is disposed at an uppermost end and a lowermost end of the rotor core, and at least one second core layer is included.

The present invention includes a second core layer having a space to minimize leakage magnetic fluxes of a magnet, and minimizes support bosses formed on a side surface of a base of a first core layer to increase the output of a motor and decrease the weight of the motor.

BRIEF DESCRIPTION OF DRAWINGS

FIG. 1 is a perspective view illustrating a rotor of a motor according to an embodiment of the present invention;

FIG. 2 is a perspective view illustrating a rotor core according to an embodiment of the present invention;

FIG. 3 is a sectional view taken along line A-A' of FIG. 2;

FIG. 4 is a plan view illustrating a first core sheet according to an embodiment of the present invention;

FIG. 5 is a perspective view illustrating a first core layer formed by stacking first core sheets of FIG. 4;

FIG. 6 is a plan view illustrating a second core sheet according to an embodiment of the present invention; and FIG. 7 is a perspective view illustrating a second core layer formed by stacking second core sheets on a first core layer of FIG. 5.

MODE FOR THE INVENTION

Hereinafter, the present invention will be described in detail with reference to the accompanying drawings.

FIG. 1 is a perspective view illustrating a rotor of a motor according to an embodiment of the present invention. FIG. 2 is a perspective view illustrating a rotor core according to an embodiment of the present invention. FIG. 3 is a sectional view taken along line A-A' of FIG. 2.

Referring to FIGS. 1 to 3, the rotor of a motor according to the embodiment of the present invention includes a shaft 1, a rotor core 2, and a magnet 3.

The rotor core 2 is manufactured by stacking a plurality of thin steel plates, and a plurality of magnets 3 may be inserted into the rotor core 2. A hole through which the shaft 1 passes is formed at a central portion of the rotor core 2. The shaft 1 is fixed to a central portion of the rotor core 2 to be rotated together with the rotor core 2.

The rotor core 2 is formed by alternately stacking two different core layers, that is, the first core layer L1 and the second core layer L2. Then, it is preferable that the first core layers L1 are disposed at an uppermost end and a lowermost end of the rotor core 2, and one or more second core layers L2 are included.

As illustrated in FIG. 2, the first core layer L1 has a support boss pattern P in which support bosses 14 for supporting the magnet 3 on a side surface of the base 11 appear discontinuously in the direction of a rotation axis of the first core layer L1, and as illustrated in FIG. 3, the second core layer L2 has a space 21 for preventing the second core layer L2 from contacting the shaft 1 by removing the base 11.

The rotor core according to the present invention, including the first and second core layers L1 and L2 reduces a leakage magnetic flux, in particular, a leakage magnetic flux leaked towards the rotation axis of the rotor core through the base 11, and reduces the weight of the entire motor, thereby improving output and efficiency.

Hereinafter, a stack structure of the rotor core 2 including the first core layer L1 and the second core layer L2 according to the present invention will be described in more detail.

FIG. 4 is a plan view illustrating a first core sheet according to an embodiment of the present invention. FIG. 5 is a perspective view illustrating a first core layer L1 formed by stacking first core sheets of FIG. 4.

The first core sheet 10 according to the embodiment of the present invention may be manufactured by striking a thin steel plate, and the first core layer L1 is formed by stacking the first core sheets 10.

Referring to FIG. 4, the first core sheet 10 according to the embodiment of the present invention includes a base 11 yokes 12, bridges 13, and support bosses 14.

An annular ring-shaped base 11 having a shaft through-hole 15 is located at a central portion of the first core sheet 10. The shaft through-hole 15 is a part through which the shaft 1 passes to be fixed.

A plurality of yokes 12 are disposed around an outer peripheral surface of the base 11. The shape and number of the yokes 12 may be variously changed, and the embodiment of the present invention exemplifies eight yokes 12 having a fan shape as illustrated in FIG. 3.

The yokes 12 support the magnets 3, and form a passage for a magnetic flux generated by the magnet 3. The yokes 12 are arranged along a circumferential direction of the base 11, and are spaced apart from each other to form magnet insertion parts 16 for accommodating the magnets 3.

For example, as illustrated in FIG. 3, the plurality of yokes 12 may be situated at locations formed by equally dividing a circumference of the base 11. That is, when the center points of the arcs of the yokes are connected to the center point of the annular ring, angles formed by adjacent connection lines are constant. When eight yokes are arranged in FIG. 3, the angle formed by the adjacent connection lines is 45 degrees.

A yoke through-hole 17 may be formed in the interior of each of the yokes 12, and a rivet or a coupling boss of the rotor cover may be inserted into the yoke through-hole 17. A first fixing boss 18 and a second fixing boss 19 protruding in the direction of the arc of the yoke 12 may be formed at opposite peripheral portions of an outer end of the yoke 12. When the magnets 3 are inserted into the magnet insertion parts 16, the first and second fixing bosses 18 and 19 fix the locations of the magnets together with the support bosses 14, and function to prevent spattering of the magnets when the rotor is rotated.

The yokes 12 may be connected to the base 11 through the bridges 13. The bridges 13 are arranged along a circumferential direction of the base 11 in correspondence to the yokes 12. The bridges 13 extend from an outer circumference of the base 11 toward the outer radial side, and may be connected to an inner end of the corresponding yoke 12.

The support bosses 14 may protrude from the base 11 into a space for the magnet insertion parts 16 between the two bridges 13 that are adjacent in the circumferential direction of the base 11.

Then, when an outer circumference of the base 11 connecting the two adjacent bridges 13 is defined as a boss forming part 11a, the support bosses 14 are not formed in all the boss forming parts 11a and at least one boss forming part 11a does not have a support boss 14.

In the first embodiment, as illustrated in FIG. 3, the support bosses 14 are formed in the first, third, fifth, and seventh boss forming parts 11a corresponding to the odd numbers along the circumferential direction of the base 11 among the eight boss forming parts 11a, but the support bosses 14 may not be formed in the second, fourth, sixth, and eighth boss forming parts 11a corresponding to even numbers.

In the second embodiment, unlike the embodiment illustrated in FIG. 3, the support bosses 14 may be formed only in the first, second, third, and fourth boss forming parts 11a along the circumferential direction of the base 11 among the eight boss forming parts 11a.

If the support bosses 14 are not formed in one or more boss forming parts 11a, the support bosses 14 may be formed in the boss forming parts 11a selected in various forms according to the number of the boss forming parts 11a and the thickness of the first core layers L1.

In this way, the support bosses 14 are formed only in some of the plurality of boss forming parts 11a of the first core sheet 10 according to the present invention, and as the first core sheets 10 are stacked while rotating at a predetermined angle, the support bosses 14 discontinuously appear on a side surface of the base of the first core layer L1.

That is, when the support bosses 14 are formed in the first, third, fifth, and seventh boss forming parts 11a corresponding to odd numbers as in the first embodiment, one first core sheet 10 stacked on another first core sheet 10 may be stacked after being rotated about the rotation axis thereof by 45 degrees. If the process is repeated, a discontinuous support boss pattern P in which the boss forming parts 11*a* having support bosses 14 in an axial direction thereof and the boss forming parts 11*a* having no support boss 14 alternately appear is formed on a side surface of the base 11 of the first core layer L1.

Furthermore, when the support bosses 14 are formed only in the first, second, third, and fourth boss forming parts 11*a* as in the second embodiment, the support boss pattern P having the same form as in the former case may be formed by stacking the first core sheet 10 after rotating the first core sheet 10 by 180 degrees.

Meanwhile, the first core layer L1 according to the embodiment of the present invention is adapted only to increase the output and efficiency of the rotor core by reducing the number of the support bosses 14 but the present invention is not limited to the support boss pattern P, and various support boss patterns P may be formed according to a location of the support boss 14 in the first core sheet 10 and an angle by which the first core sheet 10 is rotated when being stacked.

For example, when the rotation angle is 90 degrees in the second embodiment, a support boss pattern P different from the above-described one may be formed in a method in which the boss forming parts 11*a* having the support bosses 14 continuously appear twice and then the boss forming parts 11*a* having no support boss 14 continuously appear twice.

FIG. 6 is a plan view illustrating a second core sheet according to an embodiment of the present invention. FIG. 7 is a perspective view illustrating a second core layer L2 formed by stacking second core sheets on a first core layer L1 of FIG. 5.

Referring to FIG. 6, the second core sheet 20 according to the embodiment of the present invention includes only a plurality of yokes 12 while the bases 11 and the bridges 13 are removed, and the yokes 12 having the same shape as the yokes 12 of the first core sheet 10 are disposed at the same locations.

As illustrated in FIG. 6, the second core sheets 20 are stacked on the first core layer L1 to form the second core layer L2, and a space 21 that is empty and does not make contact with the shaft 1 is formed by removing the base 11 and the bridges 13 unlike the first core layer L1 in the second core layer L2.

In this way, because an empty space is formed in the second core layer L2, some magnetic fluxes can be restrained from being leaked towards the shaft 1 through the base 11 of the rotor core in a spoke type permanent magnet motor.

Meanwhile, it is preferable that the second core layers L2 are formed between the first core layers L1, one or more layers may be formed in the entire rotor core. The rotor core illustrated in FIG. 2 is formed by repeatedly stacking the first core layers L1 and the second core layers L2, and five first core layers L1 and four second core layers L2 may be provided. Then, the thickness and number of the layers may be adjusted as necessary.

Although the present invention has been described in detail, the scope of the present invention is not limited or restricted by the description. The above description is simply an example of the present invention and the scope of the present invention is determined by the claims, and it is noted that simple modifications and changes of the present invention also pertain to the scope of the present invention.

The invention claimed is:

1. A stack structure of a rotor core, comprising:
a first core layer being formed by stacking first core sheets, each of the first core sheets comprising:
an annular base having a shaft through-hole at a central portion thereof;
a plurality of yokes spaced apart from each other to be arranged along a circumferential direction of the annular base and to form a plurality of magnet insertion parts for accommodating magnets;
a plurality of bridges connecting the annular base and the yokes;
a plurality of boss forming parts formed at the annular base between two adjacent bridges; and
support bosses protruding from some of the boss forming parts into spaces of the magnet insertion parts; and
a second core layer being formed by stacking second core sheets,
wherein each of the second core sheets comprises a plurality of yokes without the annular base and the bridges such that a space is formed between the second core layer and a shaft inserted into the shaft through-hole,
wherein the first core layer and the second core layer are alternately stacked, and the first core layer is disposed at an uppermost end and a lowermost end of the rotor core,
wherein the number of the yokes is eight such that a first, second, third, fourth, fifth, sixth, seventh and eighth boss forming parts are formed at the annular base, and an annular base of the first core layer has eight side surfaces, and
wherein the support bosses are formed at the first, second, third and fourth boss forming parts, and each of the first core sheets is configured to be stacked after being rotated at 90 degrees such that the support bosses do not appear twice in a row after appearing twice in a row on each of the eight side surfaces of the annular base of the first core layer.

* * * * *